April 19, 1932. T. TARISIEN 1,854,722
FLUID PRESSURE BRAKE
Filed April 17, 1930
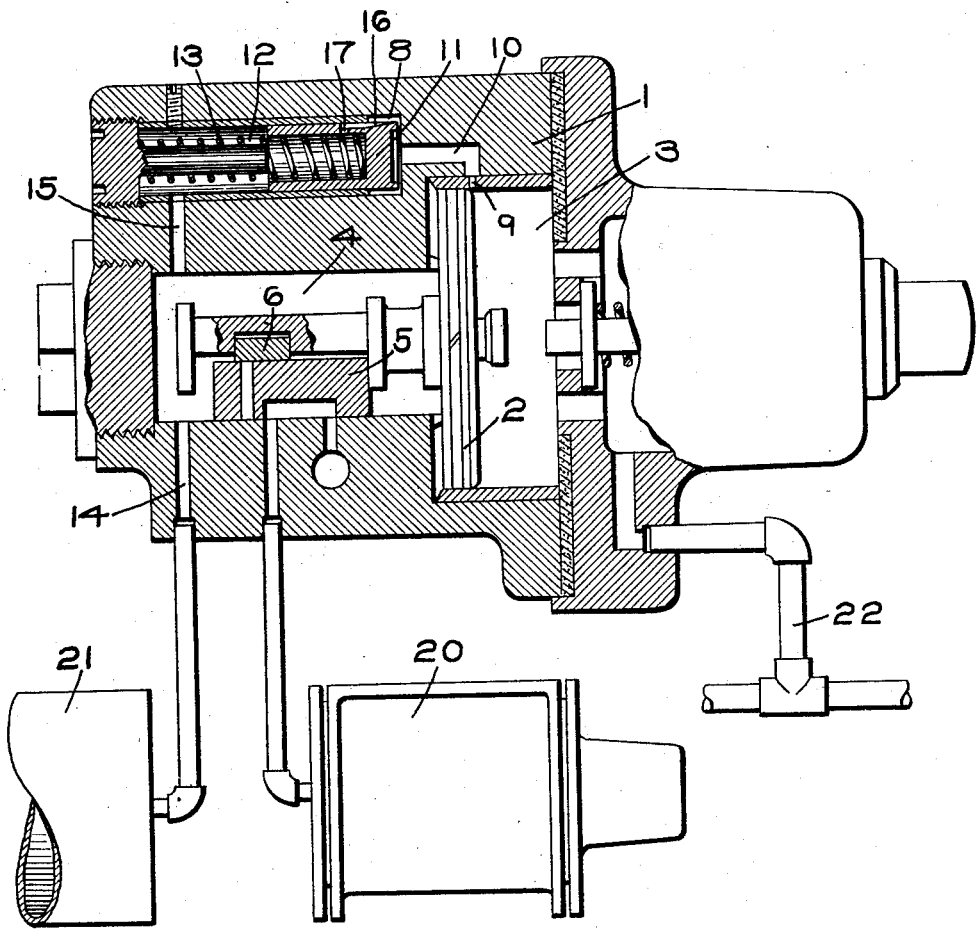
INVENTOR
THÉOPHILE TARISIEN
BY *Wm. M. Cady*
ATTORNEY Patented Apr. 19, 1932

1,854,722

UNITED STATES PATENT OFFICE

THEOPHILE TARISIEN, OF ALLEE D'AGUESSEAU LIVRY-GARGAN, FRANCE, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed April 17, 1930, Serial No. 444,890, and in France August 9, 1929.

This invention relates to fluid pressure braking apparatus of the kind in which the supply of fluid under pressure to and its release from the brake cylinder or cylinders is arranged to be effected by varying the pressure of the fluid in the brake pipe of the braking system.

In such braking apparatus the supply of fluid under pressure to and its release from the brake cylinder or cylinders is arranged to be controlled by a distributing or triple valve device which also serves to permit, when the brake pipe pressure is raised, the supply of fluid under pressure from the brake pipe to an auxiliary reservoir from which fluid is arranged to be supplied to the brake cylinder associated with the valve device in order to effect an application of the brakes.

According to the principal feature of the present invention the supply of fluid under pressure from the brake pipe to the auxiliary reservoir is arranged to be controlled by a graduating valve device associated with an abutment subject on the one hand to the pressure of the fluid in the brake pipe and on the other hand to the pressure of the fluid in the auxiliary reservoir and spring pressure.

In order that the invention may be readily understood it will now be described, by way of example, with reference to the accompanying drawing, the single figure of which is a diagrammatic view of a fluid pressure brake equipment including a triple valve device having the improved graduating valve for controlling the supply of fluid under pressure to the auxiliary reservoir mounted in the body of the triple valve itself.

Referring now to the drawing, the fluid pressure brake equipment comprises a triple valve device 1, a brake cylinder 20, an auxiliary reservoir 21, and a brake pipe 22. The triple valve device 1 comprises a casing having a piston chamber 3 connected to the brake pipe 22 and containing piston 2 and having a valve chamber 4 connected to the auxiliary reservoir 21 and containing a main slide valve 5 and a graduating valve 6, adapted to be operated by piston 2.

The brake pipe 22 of the braking system is in permanent communication with the chamber 3 and the chamber 3 is arranged to be in communication with another chamber 8 in the body of the triple valve device through a port 9 and passage 10, when the triple valve piston 2 is in the release position as illustrated in the drawing.

A piston 11 located in a chamber 12 in the body of the triple valve device is subject on one side to the brake pipe pressure in the chamber 8 and on the other side to the pressure of a spring 13 and auxiliary reservoir pressure in the chamber 12, the auxiliary reservoir 21 being in communication with the chamber 12 through a port 14, the slide valve chamber 4, and a passage 15 in the body of the triple valve device.

When the brake pipe pressure is raised in order to release the brakes and recharge the braking system, fluid under pressure flows from the brake pipe into the chamber 3 and, the pressure building up in said chamber, causes the piston 2 to move towards the left into the position in which it is illustrated in the drawing, in which the port 9 is uncovered by the piston. Fluid then flows from the chamber 3 through the port 9 and passage 10 into the chamber 8 and thence through the groove or recess 16, in the piston 11, a port 17 in said piston, the chamber 12, passage 15, slide valve chamber 4, and port 14 into the auxiliary reservoir. Should the brake pipe pressure increase above the normal standard working pressure owing, for instance, to local surges in the brake pipe, the increased pressure on the right hand of the piston 11 will cause the latter to move toward the left against the opposing auxiliary reservoir pressure and the pressure of the spring 13, thus restricting the flow of fluid from the brake pipe to the auxiliary reservoir owing to the groove or recess 16 in the piston 11 being arranged to decrease in cross sectional area toward the right hand of the piston as shown in the drawing. Thus overcharging of the auxiliary reservoir is prevented. Moreover, during the initial period of charging or recharging, when the auxiliary reservoir pressure is low, the piston 11 will tend to be moved toward the left by train pipe pressure, whether or not the latter is above its normal or standard value, so that the pistons of the triple valve devices throughout the length of a train are moved to their release positions substantially simultaneously, as is desired, because, the supply of fluid to the auxiliary reservoir at the head of the train is restricted owing to the form of the groove or recess 16 in the piston 11, with the result that the pressure wave caused by supplying fluid to the brake pipe at the head of the train is rapidly propagated throughout the length of the train.

It will be evident that the invention is not limited to the particular construction and arrangement of parts hereinabove described, which may be varied as desired to suit particular requirements without exceeding the scope of the invention.

Having now described my invention, what I claim as new and desire to secure by Letters Patent, is:

1. In a fluid pressure brake, the combination with a brake pipe, auxiliary reservoir, a brake cylinder, and a valve device operated by a reduction in brake pipe pressure for supplying fluid under pressure from the auxiliary reservoir to the brake cylinder, of a movable abutment subject to the opposing pressures of the auxiliary reservoir and the brake pipe for controlling communication through which fluid under pressure is supplied from the brake pipe to the auxiliary reservoir and operated to restrict said communication in proportion to the extent to which the brake pipe pressure is increased over the auxiliary reservoir pressure.

2. In a fluid pressure brake, the combination with a brake pipe, auxiliary reservoir, a brake cylinder, and a valve device operated by a reduction in brake pipe pressure for supplying fluid under pressure from the auxiliary reservoir to the brake cylinder, of a movable abutment subject to the opposing pressures of the auxiliary reservoir and the brake pipe for controlling a port of varying cross section through which fluid under pressure is supplied from the brake pipe to the auxiliary reservoir, to thereby restrict the rate of flow of fluid from the brake pipe to the auxiliary reservoir by movement of said abutment according to the degree with which the brake pipe pressure exceeds the auxiliary reservoir pressure.

3. In a fluid pressure brake, the combination with a brake pipe, auxiliary reservoir, a brake cylinder, and a valve device operated by a reduction in brake pipe pressure for supplying fluid under pressure from the auxiliary reservoir to the brake cylinder, of a spring and a movable abutment subject on one side to auxiliary reservoir pressure and the pressure of said spring and on the opposite side to brake pipe pressure for controlling communication through which fluid under pressure is supplied from the brake pipe to the auxiliary reservoir, the flow area being reduced by the movement of said abutment, and the movement of said abutment being proportional to the extent to which the brake pipe pressure is increased above the auxiliary reservoir pressure.

In testimony whereof, I have hereunto set my hand this 17th day of March, 1930.

THEOPHILE TARISIEN.